Oct. 25, 1966  C. VORPAHL  3,280,639
WHEEL BALANCING APPARATUS
Filed July 26, 1963
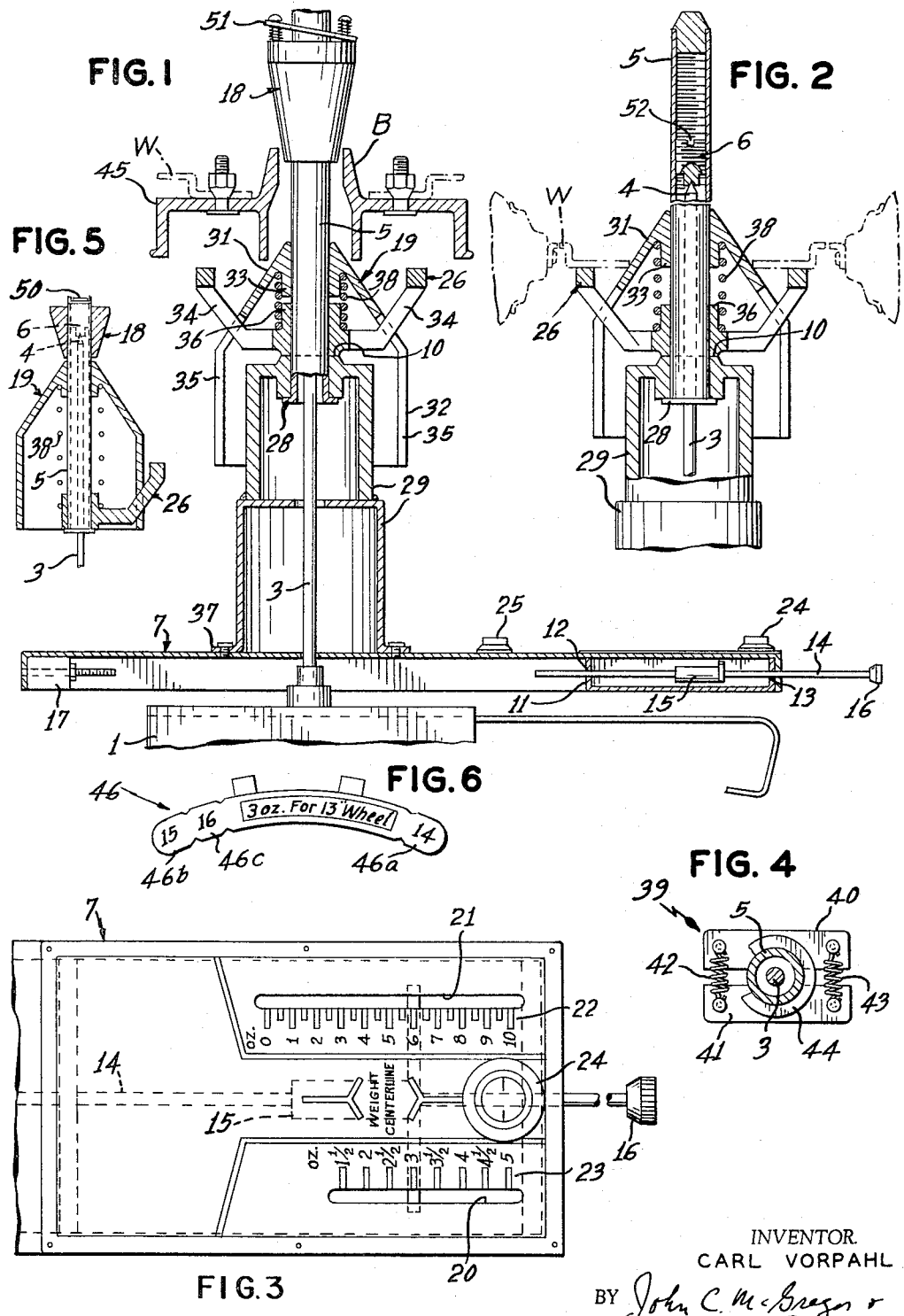
INVENTOR.
CARL VORPAHL
BY John C. McGregor &
James A. Eiseman
his ATTORNEYS United States Patent Office
3,280,639
Patented Oct. 25, 1966

3,280,639
WHEEL BALANCING APPARATUS
Carl Vorpahl, 18 Nursery Road, Huntington Station, N.Y.
Filed July 26, 1963, Ser. No. 297,745
4 Claims. (Cl. 73—484)

This invention relates to improvements in wheel balancing devices, and more particularly to apparatus for detecting and measuring unbalance in automotive wheels, tires and brake drums to determine the sizes and locations of balance weights to be attached.

It is known that a primary cause of unbalance in automotive wheels is lack of peripheral uniformity in the pneumatic tires. Such unbalances are usually compensated by means of small lead weights located on the wheel rim and held in place by tabs extending between the tire and the rim.

There are two general types of wheel balancing methods, each requiring a characteristic type of apparatus; one is to spin the wheel rapidly on its axle, which is supported in such manner as to permit radial movement. The degree of unbalance and the point where a balance weight should be located are determined approximately by visual observations, for example with a stroboscopic device, or somewhat more accurately by apparatus that indicates or records quantitatively the amount of radial displacement and its direction with respect to a reference radius of the wheel.

In the other type of wheel balancing, the wheel is removed from its axle and mounted on a vertical shaft which is suspended, for example, on a pivot bearing, in such manner as to allow the plane of the wheel to tilt downward in the direction of the effective center of the excess weight. A level placed on or secured to the shaft indicates the direction of tilt, and test weights are placed on the high side of the rim to level the wheel. The sum of the test weights is noted, and an equivalent balance weight or group of balance weights substituted.

The first of the above methods, spinning, requires complex and expensive apparatus and specialized skill to operate it. The second method is simpler, uses much less expensive apparatus, but is more tedious and requires a certain amount of judgment. Implicit in the latter methods is the assumption that the brake drums are balanced, since it is contemplated that a wheel and tire, once balanced, can be moved from any axle of the vehicle to any other. If the brake drums themselves are unbalanced, as may be the case especially on modern automobiles having larger and heavier brake drums than were used in older designs, they should also be balanced. This can be done separately, although possible variation in studs and mounting holes makes desirable the balancing of the drum and wheel, bolted together as one.

The principal object of the present invention is to provide improvements in apparatus for use in the method wherein wheels, or wheels and mated brake drums are removed from the vehicle and mounted on a vertical pivoted shaft for balancing, the invention providing means for accommodating the parts either way.

More specifically, it is an object to provide apparatus of the foregoing type which is simpler to use and more accurate than prior devices.

Another object is to provide apparatus adapted to balance brake drums separately, to permit placing any balanced wheel on any axle without rebalancing.

According to the present invention there is provided a centering head arrangement with means for enabling it to accommodate a brake drum, wheel and tire assembly which has a relatively small center opening, or a wheel and tire alone, which presents a relatively larger center opening. A single test weight is used, and is supported for adjustment radially of the shaft to level the assembly to be balanced. Calibrated scales show the position of the test weight in terms of the total balance weight needed, and in terms of the amount needed on one side of the wheel. With this arrangement, the actual balancing can be carried out in two steps; the first being an approximate compensation of half the total unbalance, and the second a more precise compensation of the remainder.

The invention will be described with reference to the accompanying drawing, wherein:

FIG. 1 is a front elevation, partly in cross section and partly broken away to show internal details of a wheel balancer constituting a presently preferred embodiment of the invention and showing a brake drum, wheel and tire assembly being balanced;

FIG. 2 is a fragmentary view in vertical section of the upper part of a balancer similar to that of FIG. 1, showing a wheel and tire assembly being balanced; and illustrating a modification in the adjusting mechanism;

FIG. 3 is a plan view of one end of the beam element of the device of FIG. 1, showing the scale member indicating the position of the test balance weight;

FIG. 4 shows a latch device used, if desired, to adjustably shift the centering head on the shaft;

FIG. 5 is a fragmentary view in reduced scale of a simplified embodiment of the invention showing the relative positions of the centering head without a work piece in place; and FIG. 6 is a plan view of a wheel weight calibrated to provide separable portions for use with a range of wheel diameters.

Referring to FIG. 1, a base member 1 supports an upright rod 3 provided with a pivot point 4 at its upper end. A tubular shaft 5 surrounds the rod 3 and is suspended freely thereon by a pivot seat 6 inside the shaft engaging the pivot point 4.

A hollow beam 7 of generally rectangular cross section is carried by the flanged lower end of the shaft 5, by means of a two-piece cylindrical fitting 29 also flanged at its lower end to afford a bolting shoulder 37. The upper surface 10 of the fitting 29 is machined perpendicular to the axis of the shaft 5, to support parts to be described. A bracket 11 is secured inside the beam 7 near the right hand end as shown in FIG. 1, and is provided with openings 12 and 13 for slidably supporting a rod 14 in longitudinal alignment with the beam 7.

A weight 15 is secured to and supported by the rod 14. A handle or knob 16 is provided at the outer end of the rod 14 for manual adjustment of the radial distance of the weight 15 from the central axis of the shaft 5. A counterweight 17 is disposed inside the beam 7 at its left hand end, as viewed in FIG. 1. The size and position of the counterweight 17 are so chosen that the beam and weight assembly is balanced when the weight 15 is at its innermost position.

Referring to FIG. 3, the upper wall of the hollow beam 7 is provided with parallel longitudinal slots 20 and 21, disposed on opposite sides of the center line and extending throughout the range of movement of the weight 15. Calibrated scales 22 and 23 are arranged adjacent the slots 20 and 21 for indications against one edge of the weight or suitable fiducial marks on the upper surface thereof. The scales may be carried on the upper surface of the beam, or upon a transparent overlay secured thereto. A circular level 24 is mounted at the center of the beam 7 near its outer end. It may be desirable, although not essential, to provide a second, more sensitive level 25 somewhat closer to the shaft 5, as shown in FIG. 1.

Referring to FIGS. 1 and 5, supported on the internally pivoted shaft 5 is a centering head comprising upper and lower cone members 18 and 19, respectively, for accurately centering and supporting a tire, wheel and brake-drum assembly to be balanced. Both cone members are provided with bores for sliding fit on the shaft 5 without freedom for cocking movement or lateral play. Associated with the lower cone member 19 is a spider having a ring 26 surrounding the conical surface. A coil spring 38 reacts between the spider and the cone member 19 to urge the latter upwardly.

The lower unit 19 of the centering head assembly includes a hollow conical upper portion 31 and a cylindrical skirt 32. The upper end of the conical portion 31 contains a boss 33 bored to a sliding fit on the shaft 5. The ring 26 of the spider is supported by a plurality of arms 34 extending through longitudinal slots 35 formed in the wall of the cylindrical skirt 32. The arms 34 are joined by a central sleeve 36 which is slidable on the shaft 5. The cylindrical fitting or support 29 hung from a flange 28 on the lower end of the shaft 5 carries the beam 7 at its lower end through the flange 37. Thus the shaft 5, the support 29 and the beam 7 form an integrated structure which pivots as one on the block 6.

In the balancing operation a brake drum B, wheel W and tire assembly is placed on the shaft 5 by first removing the upper cone 18 and resting the hub of the drum 45 on the lower cone 19. The upper cone 18 is then placed on the shaft 5 and pressed down, centering the drum 45 on the lower cone 19. If desired, a releasable locking device 51 can be used with the upper cone 18 to hold it in place, although for most uses the weight of the upper cone is sufficient. The weight of the assembly compresses the spring 38 and lowers the load to a point at which its center of gravity is beneath the pivot point 4. The pivot point is so located that the center of gravity of the movable portion of the unit, including either a brake drum alone, a brake drum wheel and tire assembly or a wheel and tire assembly will be suspended beneath the pivot for effective balancing action. In one preferred arrangement the pivot point of the device was approximately three inches above the ring 26, causing a wide range of parts to be balanced to fall within the correct balancing zone. However, if desired, a special adjustment can be provided as described below, having reference to FIGS. 2 or 4.

Any unbalance in the brake drum assembly 45 will cause the pivoted shaft 5 to tilt from the vertical, tilting the beam 7 from the horizontal. The direction of tilt will be indicated on levels 24 and 25 (FIGS. 1 and 3). The drum is rotated manually with respect to the beam 7 while observing the level 25, to bring the lightest point of the drum directly over the center line of the right hand portion of the beam. This is indicated by a maximum deflection of the bubble in the level directly along the beam axis, toward the right hand end as viewed on FIGS. 1 and 3. The knob 16 is moved to adjust the position of the test weight 15 and return the beam 7 to the horizontal, as indicated by centering the bubble in the level 24. The position of the weight 15 is indicated on scales 22 and 23.

Either of scales 22 and 23 may be calibrated in terms of the actual value in ounces of balance weight 46 (FIG. 6) attached to the rim of the wheel, as is well known in the art. It is preferred at present to calibrate the scale 22 in terms of the total balance weight that would be required at the rim of the smallest of the presently used standard size wheel, and the scale 23 in terms of one-half said total weight. The weight 46 is calibrated or scored, in accordance with the invention so that sections 46a, 46b or 46c can be clipped off for use, respectively, with 14, 15 or 16 inch wheels, each section being appropriately marked for identification. For balancing drums alone, the readings on scale 22 are regarded as arbitrary members representing respective drum balance weights of the required actual values.

Because the balance of heavier assemblies of larger radius can render a system over sensitive and unstable in relation to the position of the pivot seat used, it is sometimes desirable to provide means to adjust the pivot seat relatively to the centering head. One such device, in accordance with the present invention, is an adjustable seating latch 39 of the type shown in FIG. 4. The latch 39 is mounted on the shaft 5 above the shoulder or flange 28 so that the collar or sleeve of the member 29 rests on the latch. A collar 44 is secured to the shaft 5 for cooperation with a latch device 39 to support the centering head assembly at a predetermined height on the shaft 5 by abutment with the sleeve of the member 29. The latch device 39 comprises a pair of bars 40 and 41 provided with arcuate cutouts adapted to fit the shaft 5, and a pair of tension springs 42 and 43 connecting the respective ends of the bars to urge them toward each other. The bars 40 and 41 may be spread apart manually to enable the latch to be passed over the flange 28. Thus the entire head assembly can be raised and lowered relative to the pivot point. An alternative adjustment is illustrated in FIG. 2 and is described below.

Preferably, the balancing is done in two steps: the wheel or part to be balanced is rotated by turning the supporting head in the shoulder 10 until the light part is over the counterweight beam 7 and the knob 16 is initially adjusted to level the beam 7, whereupon the scale 23 indicates one-half the total weight required at the rim. A balance weight of the indicated value (approximately one-half the total) is then attached to the rim on one side, e.g. the inner side which faces the body of the vehicle when the wheel is in use. The weight is attached over the center line of the scale, as indicated. The knob 16 is adjusted again to re-level the partially balanced wheel, and the remaining weight needed is indicated on the scale 22. A second balance weight of the indicated value is then attached to the other side of the rim, and the level is checked again to verify final balance.

The above described method is considered desirable because it automatically ensures that the total balancing weight is divided approximately equally between the two sides of the wheel, without requiring the operator to perform a mental calculation which, although simple, offers a possibility of error. Also, the requirement for re-leveling after the first weight is attached affords a check against error, in that a marked difference between the first and second values is a warning that some mistake has been made.

In addition, the above method obviates any need for a plurality of sets of scales to accommodate different standard rim sizes. For example, assume that the scales 22 and 23 are calibrated for use with a 14 inch rim. If the equipment is used with a 15 inch rim, the weight indicated on scale 22 as required to be placed on the inner side of the rim will be somewhat greater than the weight actually required at that point. When the indicated weight is attached and the wheel is re-leveled, the scale 23 will indicate a value somewhat smaller than the value previously shown on scale 22. Ordinarily, if the somewhat smaller indicated weight is attached, it will be found that the wheel is satisfactorily balanced, although the total is not exactly evenly divided between the two weights.

It will be understood that the cone lowers against the force of the spring 38 under the weight of the assembly being balanced. If a wheel and tire only is being balanced (FIG. 2) it is stopped by the ring of the spider 26 which rests on the upper surface 10 of the member 37. When a brake drum or drum, wheel, and tire assembly are being balanced the lower cone 19 is completely depressed until the lower surface of the boss 33 is resting on the upper surface of the central sleeve 36 of the spider 20. When a brake drum or drum, wheel and tire assembly is balanced, centering is effected by means of the upper and lower cones, 18 and 19 because of the relatively small internal diameter of the central opening. If a drum only is being balanced, its weight will normally be too little to adequately lower the cone member 19, in which case the drum can be pushed down manually and locked in place by the upper cone 18 which can, if desired, include a releasable latching mechanism 51. Also, in accordance with the invention, the pivot seat 6 can be adjusted up or down in the sleeve 5 as an additional means of adjusting the pivot point relative to the centers of gravity of the assemblies being balanced. Such means is shown in FIG. 2, in which the pivot seat 6 is threaded into the sleeve 5 and is formed with a slot 52 for receiving an adjusting tool.

While a specific presently preferred embodiment of the invention has been described, various modifications thereof may be made within the spirit of the invention. For example, a simplified arrangement can be provided, as shown in FIG. 5, by placing a level 50 on the top of the shaft 5 and eliminating the beam 7. The invention should not, therefore, be regarded as limited except as defined in the appended claims.

I claim:

1. Apparatus for balancing members, including automobile wheel and tire assemblies, brake drums, and brake drum wheel and tire assemblies, comprising a shaft and upright cone means for mounting the member to be balanced on said shaft as an axle, said cone means being adapted to engage an automobile wheel having a relatively large center opening at a lower point on its conical walls and to engage an automobile brake drum having a relatively smaller central opening at a point relatively higher on its conical walls, said cone means being vertically movable on the shaft, suspension means pivotally supporting said shaft in a nominally vertical position for free universal movement about a point on the centerline of the shaft and in the vicinity of the center of gravity of the members to be balanced, resilient means to urge the cone means upwardly, a ring member surrounding the cone means, first seat means to rigidly support the ring member on the shaft against downward axial movement to support an automobile wheel engaging the cone means and the ring, and second seat means to limit the downward travel of the cone means to support a brake drum above the ring member free of contact therewith.

2. Apparatus as set forth in claim 1, including a pivot seat carried by said shaft internally thereof and adjusting means to shift the seat vertically in the shaft.

3. Apparatus as set forth in claim 1, including a second generally conical member mounted on said shaft above first conical member for vertical sliding movement, said second conical member being inverted, whereby a member can be balanced having a central opening which is elongated along the length of the shaft can be centered on the shaft.

4. Apparatus as set forth in claim 3, including releasable latch means to hold said second conical member in a predetermined vertical position on the shaft.

References Cited by the Examiner

UNITED STATES PATENTS

| | | | |
|---|---|---|---|
| 2,075,421 | 3/1937 | Bennett | 73—484 |
| 2,110,343 | 3/1938 | Taylor | 73—483 |
| 2,122,064 | 6/1938 | Hume | 301—5 |
| 2,461,591 | 2/1949 | Currier | 73—484 |
| 2,553,058 | 5/1951 | Martin | 73—459 |
| 2,640,727 | 6/1953 | Kennedy | 301—5 |
| 2,674,122 | 4/1954 | Goltra | 73—484 |
| 2,718,781 | 9/1955 | Kiebert | 73—484 |
| 2,747,411 | 5/1956 | Lannen | 73—483 |
| 2,979,958 | 4/1961 | Kennedy | 73—483 |
| 3,152,483 | 10/1964 | Hemmeter | 73—484 |

RICHARD C. QUEISSER, *Primary Examiner.*

JAMES J. GILL, *Assistant Examiner.*